Patented July 22, 1924.

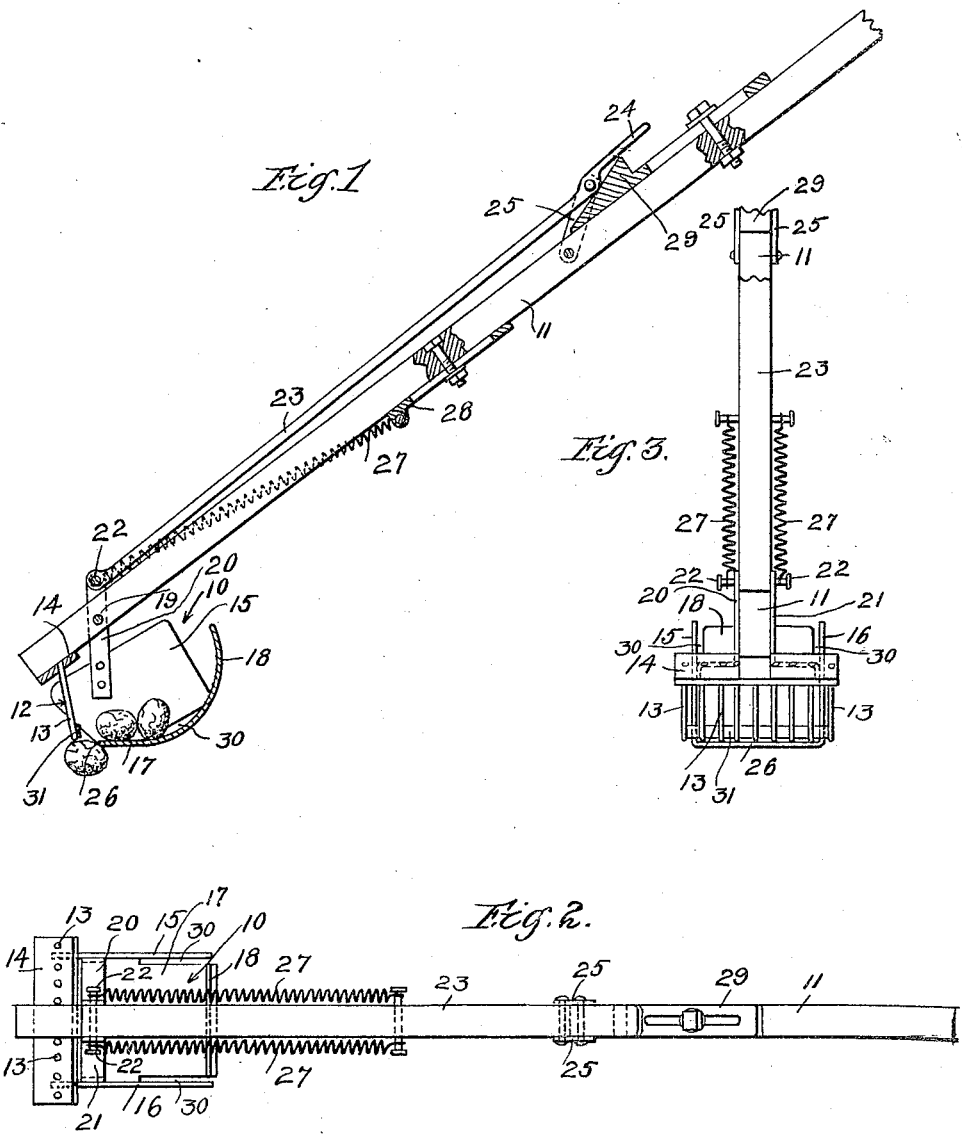

1,502,439

UNITED STATES PATENT OFFICE.

LON B. RECTOR, OF LOS ANGELES, CALIFORNIA.

PICKING DEVICE.

Application filed August 22, 1921. Serial No. 494,380.

*To all whom it may concern:*

Be it known that I, Lon B. Rector, a citizen of the United States, residing at Los Angeles, in the county of Los Angeles and State of California, have invented new and useful Improvements in Picking Devices, of which the following is a specification.

My invention relates to picking devices, and is particularly adapted to enable the operator to pick nuts and other products of a similar character from the ground in a convenient, efficient and expeditious manner without the necessity of the operator stooping or kneeling.

The object of my invention is to provide a device of the class above described which will be simple, light and durable in construction, and which when used will very materially increase the capacity of the operator.

Another object of my invention is to provide a device which may be readily adjusted to pick various varieties of products or articles of approximately a uniform size.

Other objects will appear in the following description, will be pointed out in the claims, and embodied in the accompanying drawings, in which:

Fig. 1 is a longitudinal section through the picking device.

Fig. 2 is a plan view of the same.

Fig. 3 is a front view of the same.

In carrying out my invention, 10 represents a receptacle which is mounted adjacent the outer end of a suitable operating handle 11. The extreme outer end of handle 11 is provided with a downwardly extending jaw 12 illustrated in this instance as consisting of a plurality of tines 13 secured to a cross bar 14, which is fastened in any suitable manner to the end of said handle. The side walls 15 and 16, and bottom and rear walls 17 and 18 of the receptacle 10 are formed integral, and are pivoted to the handle 11 by means of the shaft 19 which passes through a bore in said handle and bores in the oppositely disposed arms 20 and 21, the lower ends of which are secured respectively to the side walls 15 and 16 and the upper ends of which extend above the upper surface of the handle 11.

Pivoted between the upper ends of arms 20 and 21 by means of a pin 22 is one end of a bar 23 which extends rearwardly and is disposed above the handle 11 and terminates in a handle 24. The bar 23 adjacent the handle end is connected to the handle 11 by means of the pivoted links 25. The front edge 26 of the receptacle bottom 17 is adapted to be normally held against the lower ends of the tines 13 by means of the springs 27, the front ends of which are secured to the pin 22 and the rear ends of which are connected to the spring pressure adjustable slide 28 mounted on the handle 11.

By the above recited construction it will be obvious that by pressing forwardly on the handle 24 of bar 23, the receptacle 10 will be rocked on the pivotal shaft 19 to form an opening between the front edge 26 of the bottom wall 17 and the lower ends of the tines 13. In order that the edge 26 of the bottom wall 17 may be held away from the tines 13 to form an initial opening of a desired width, an adjustable wedge 29 is mounted on the top surface of the handle 11 and is adapted to be disposed between said surface and the lower surface of the bar 23.

In the operation of the device, the front edge 26 of the bottom 17 is first adjusted away from the lower ends of the tines 13 by means of the wedge 29 to form an initial and permanent opening therebetween of a width narrower than the shortest diameter of the smallest nut to be picked. The operator then grasps the handle 11 and passes over the ground, placing the device, with the ends of the tines 13 and the edge 26 of the receptacle bottom resting thereon, as shown in Fig. 1 of the drawings. By pressing lightly forwardly and downwardly, the receptacle and jaw 12 will be forced apart until the opening is of sufficient width to admit the nut; at this time the edge 26 is forced under the nut and as it is moved forwardly by action of the springs 27 the nut is caused to be forced into the receptacle. This action is repeated until the receptacle is filled with nuts. The operator then places the receptacle 10 over a basket, bucket, or other suitable container, and by pressing forwardly on handle 24 causes the edge 26 to swing rearwardly, thereby enlarging the opening between said edge and the ends of the tines, and thus permitting the nuts to roll from the receptacle into the larger container.

Spacers 30 are left between the sides 15 and 16 and bottom 17 in order that all dirt and foreign matter will fall out of the receptacle before the nuts are dumped into the container, and a guard bar 31 is secured transversely across the lower end of the tines 13 in order that the tine ends will not become caught in and entangled with any long grass or leaves that may be present in the field of operation.

By the foregoing recited construction and mode of operation it will be obvious that by the use of my picking device an operator will be able to quickly gather nuts from the ground and deposit the same into a suitable container in a very rapid and efficient manner, without the necessity of stooping, and with a minimum amount of exertion.

What I claim is:

1. In a nut picking apparatus, a handle member provided with a jaw member, a receptacle pivotally secured to said handle adjacent the jaw member, means to normally maintain said receptacle in yielding contact with said jaw member, and means to adjust said receptacle away from said jaw member to form an opening of a desired width therebetween.

2. In a nut picking apparatus, a handle member provided with a jaw member, a nut receiving receptacle pivoted to said handle member adjacent said jaw, spring means for normally maintaining said receptacle in yielding contact with said jaw member, whereby when the receptacle is placed against a stationary object and the handle member is pushed forwardly the jaw member and receptacle will be forced apart to form an opening therebetween, and means to swing the receptacle to an open position independently of the handle member when it is desired to empty the same.

In witness that I claim the foregoing I have hereunto subscribed my name this 27th day of July, 1921.

LON B. RECTOR.